(12) United States Patent
Piirainen

(10) Patent No.: US 7,542,734 B2
(45) Date of Patent: Jun. 2, 2009

(54) DATA TRANSMISSION SCHEME IN WIRELESS COMMUNICATION SYSTEM

(75) Inventor: Olli Piirainen, Oulu (FI)

(73) Assignee: Nokia Corporation, Espoo (FI)

( * ) Notice: Subject to any disclaimer, the term of this patent is extended or adjusted under 35 U.S.C. 154(b) by 311 days.

(21) Appl. No.: 11/247,324

(22) Filed: Oct. 12, 2005

(65) Prior Publication Data

US 2007/0054633 A1 Mar. 8, 2007

(30) Foreign Application Priority Data

Sep. 8, 2005 (FI) ................................. 20055483

(51) Int. Cl.
H03C 7/02 (2006.01)
H04B 1/02 (2006.01)
H04B 7/02 (2006.01)
H04L 1/02 (2006.01)

(52) U.S. Cl. ...................... 455/101; 455/103; 455/13.3; 455/553.1; 455/73; 455/562.1; 375/267; 375/299; 375/347

(58) Field of Classification Search ................. 455/525, 455/524, 517, 509, 450, 452.2, 25, 63.4, 455/63.1, 101, 103, 553.1, 73
See application file for complete search history.

(56) References Cited

U.S. PATENT DOCUMENTS

| 5,806,001 | A  | * | 9/1998 | Yokota ........................ 455/507 |
| 6,473,467 | B1 | * | 10/2002 | Wallace et al. ............... 375/267 |
| 6,801,564 | B2 | * | 10/2004 | Rouphael et al. ............. 375/142 |
| 2002/0196842 | A1 | * | 12/2002 | Onggosanusi et al. ....... 375/148 |
| 2004/0176063 | A1 |  | 9/2004 | Choi |
| 2005/0002468 | A1 | * | 1/2005 | Walton et al. ................ 375/267 |
| 2005/0128966 | A1 | * | 6/2005 | Yee ............................. 370/310 |
| 2005/0157807 | A1 | * | 7/2005 | Shim et al. ................... 375/267 |
| 2006/0018415 | A1 | * | 1/2006 | Jung et al. .................... 375/347 |
| 2006/0023624 | A1 | * | 2/2006 | Han et al. ..................... 370/204 |

(Continued)

FOREIGN PATENT DOCUMENTS

EP 1489 772 12/2004

(Continued)

OTHER PUBLICATIONS

Jafar, et al., "Channel Capacity And Beamforming For Multiple Transmit And Receive Antennas With Covariance Feedback" Proceedings of IEEE ICCC, vol. 7, Jun. 2001, pp. 2266-2270.

Primary Examiner—Huy Q Phan
(74) Attorney, Agent, or Firm—Squire, Sanders & Dempsey, LLP

(57) ABSTRACT

The invention provides a data transmission solution in a telecommunication system. According to the invention, a data transmission scheme is selected for a first transceiver unit, which comprises a plurality of transmit antennas, on the basis of the quality of a communication link and transmit antenna correlation information associated with the first transceiver unit, from a list including at least the following data transmission schemes: transmitting different data from each antenna of the first transceiver unit, the data transmitted from one antenna being independent of the data transmitted from another antenna; and transmitting the same data from each antenna of the first transceiver unit and controlling the direction of the transmitted data according to the properties of a radio channel. The selection of the data transmission scheme is carried out during an active communication link between the first and a second transceiver unit.

28 Claims, 2 Drawing Sheets

U.S. PATENT DOCUMENTS

| | | | |
|---|---|---|---|
| 2006/0023666 A1* | 2/2006 | Jalali et al. | 370/334 |
| 2006/0098754 A1* | 5/2006 | Kim et al. | 375/267 |
| 2007/0010196 A1* | 1/2007 | Periyalwar et al. | 455/7 |
| 2007/0263735 A1* | 11/2007 | Tong et al. | 375/260 |
| 2008/0069020 A1* | 3/2008 | Richardson | 370/311 |

FOREIGN PATENT DOCUMENTS

| | | |
|---|---|---|
| EP | 1553730 | 7/2005 |
| WO | WO 02/05506 | 1/2002 |
| WO | WO 02/51031 | 6/2002 |
| WO | WO 2004/040833 | 5/2004 |

\* cited by examiner

DATA TRANSMISSION SCHEME IN WIRELESS COMMUNICATION SYSTEM

FIELD

The invention relates generally to data transmission a wireless communication system and, particularly, to a selection of a data transmission scheme during an active communication link between two transceiver units.

BACKGROUND

Recent developments in the area of wireless communications have introduced the implementation of multiple antennas in a mobile subscriber unit as well as in a base station (or equivalent access point to a communication network) serving the mobile subscriber unit. The use of multiple antennas in the mobile subscriber unit enables "multiple input multiple output" (MIMO) communication between the mobile subscriber unit and the serving base station. MIMO communication has been introduced into wireless communications in order to improve the spectral efficiency of communication. In environments where there is no line-of-sight between the mobile subscriber unit and the base station and where there exist obstacles from which transmitted signals reflect, different signal paths between transmitter and receiver antennas may be seen as sub-channels which have different characteristics. Depending on the environment, the sub-channels may be more or less correlated. The characteristics of the sub-channels may be utilized in many ways in order to improve the data throughput and/or reliability of data transmission.

A power source (typically a battery) of the mobile subscriber unit has a limited amount of power and, therefore, power consumption of the mobile subscriber unit should be minimized. Characteristics of a transmitted signal and, particularly, the peak-to-average power ratio (PAR) of the transmitted signal typically have a significant effect on the efficiency of an amplifier and, consequently, on the power consumption of the mobile subscriber unit. High PAR sets high requirements on the radio frequency (RF) amplifier of the mobile subscriber unit and, thus, the efficiency of the RF amplifier reduces, resulting in increased power consumption. High PAR usually results from the summation of signals.

As mentioned above, the characteristics of the sub-channels may be utilized in many ways in order to improve the data throughput and/or reliability of data transmission. Efficient solutions in the data throughput point of view are schemes known as "waterfilling" transmission schemes. In short, waterfilling refers to transmitting more data into high-quality sub-channels and less data into low-quality sub-channels. The transmission of data into a sub-channel comprises the transmission of a signal from several transmitter antennas. When data is transmitted into several sub-channels, signals to be transmitted from each antenna are summed, resulting in a high PAR of the signal transmitted from one antenna and in increased power consumption.

BRIEF DESCRIPTION OF THE INVENTION

An object of the invention is to provide an improved solution for data transmission in a telecommunication system.

According to an aspect of the invention, there is provided a data transmission method in a telecommunication system. The method comprises selecting, during an active communication link between a first and a second transceiver unit, a data transmission scheme for the first transceiver unit on the basis of the quality of the communication link and transmit antenna correlation information associated with the first transceiver unit, the data transmission scheme being selected from a list comprising at least the following data transmission schemes: transmitting different data from each antenna of the first transceiver unit, the data transmitted from one antenna being independent of the data transmitted from another antenna; transmitting the same data from each antenna of the first transceiver unit and controlling the direction of the transmitted data according to the properties of a radio channel.

According to another aspect of the invention, there is provided a transceiver unit in a telecommunication system. The transceiver unit comprises a communication interface comprising a plurality of antennas for transmitting and receiving information signals, and a control unit connected to the communication interface. The control unit is configured to select a data transmission scheme on the basis of data transmission scheme information received from another transceiver unit and transmit data through the communication interface according to the selected data transmission scheme, the data transmission scheme being selected from a list comprising at least the following data transmission schemes: transmitting different data from each antenna of the communication interface, the data transmitted from one antenna being independent of the data transmitted from another antenna; transmitting the same data from each antenna of the communication interface and controlling the direction of the transmitted data according to the properties of a radio channel.

According to another aspect of the invention, there is provided a transceiver unit in a telecommunication system, the transceiver unit comprising a communication interface comprising a plurality of antennas for transmitting and receiving information signals and a control unit connected to the communication interface. The control unit is configured to select, during an active communication link with another transceiver unit, a data transmission scheme for the other transceiver unit on the basis of the quality of the communication link and transmit antenna correlation information associated with the other transceiver unit, the data transmission scheme being selected from a list comprising at least the following data transmission schemes: transmitting different data from each antenna of the other transceiver unit, the data transmitted from one antenna being independent of the data transmitted from another antenna; transmitting the same data from each antenna of the other transceiver unit and controlling the direction of the transmitted data according to the properties of a radio channel.

According to another aspect of the invention, there is provided a telecommunication system, comprising a first transceiver unit and a second transceiver unit in communication with the first transceiver unit, the first transceiver unit comprising a communication interface comprising a plurality of antennas for transmitting and receiving information signals, and a control unit connected to the communication interface. The second transceiver unit comprising a communication interface comprising a plurality of antennas for transmitting and receiving information signals, and a control unit connected to the communication interface. The control unit of the first transceiver unit is configured to select a data transmission scheme on the basis of data transmission scheme information received from the second transceiver unit and transmit data through the communication interface according to the selected data transmission scheme. The control unit of the second transceiver unit is configured to select, during an active communication link between the first and the second transceiver unit, a data transmission scheme for the first transceiver unit on the basis of the quality of the communication link and transmit antenna correlation information associated with the first transceiver unit, the data transmission scheme being selected from a list comprising at least the following data transmission schemes: transmitting different data from each antenna of the first transceiver unit, the data transmitted from one antenna being independent of the data transmitted from another antenna; transmitting the same data from each antenna of the first transceiver unit and controlling the direction of the transmitted data according to the properties of a radio channel.

According to another aspect of the invention, there is provided a transmitter unit in a telecommunication system. The transmitter unit comprises a communication interface comprising a plurality of antennas for transmitting information signals and a control unit connected to the communication interface. The control unit is configured to select a data transmission scheme on the basis of data transmission scheme selection instructions and transmit data through the communication interface according to the selected data transmission scheme, the data transmission scheme being selected from a list comprising at least the following data transmission schemes: transmitting different data from each antenna of the communication interface, the data transmitted from one antenna being independent of the data transmitted from another antenna; transmitting the same data from each antenna of the communication interface and controlling the direction of the transmitted data according to the properties of a radio channel.

According to another aspect of the invention, there is provided a receiver unit in a telecommunication system. The receiver unit comprises a communication interface comprising a plurality of antennas for receiving information signals and a control unit connected to the communication interface. The control unit is configured to select, during an active communication link with a transmitter unit, a data transmission scheme for the transmitter unit on the basis of the quality of the communication link and transmit antenna correlation information associated with the transmitter unit, the data transmission scheme being selected from a list comprising at least the following data transmission schemes: transmitting different data from each antenna of the transmitter unit, the data transmitted from one antenna being independent of the data transmitted from another antenna; transmitting the same data from each antenna of the transmitter unit and controlling the direction of the transmitted data according to the properties of a radio channel.

According to another aspect of the invention, there is provided a computer program product encoding a computer program of instructions for executing a computer process for data transmission in a telecommunication system. The process comprises selecting, during an active communication link between a first and a second transceiver unit, a data transmission scheme for the first transceiver unit on the basis of the quality of the communication link and transmit antenna correlation information associated with the first transceiver unit, the data transmission scheme being selected from a list comprising at least the following data transmission schemes: transmitting different data from each antenna of the first transceiver unit, the data transmitted from one antenna being independent of the data transmitted from another antenna; transmitting the same data from each antenna of the first transceiver unit and controlling the direction of the transmitted data according to the properties of a radio channel.

According to another aspect of the invention, there is provided a computer program distribution medium readable by a computer and encoding a computer program of instructions for executing a computer process for data transmission in a telecommunication system. The process comprises selecting, during an active communication link between a first and a second transceiver unit, a data transmission scheme for the first transceiver unit on the basis of the quality of the communication link and transmit antenna correlation information associated with the first transceiver unit, the data transmission scheme being selected from a list comprising at least the following data transmission schemes: transmitting different data from each antenna of the first transceiver unit, the data transmitted from one antenna being independent of the data transmitted from another antenna; transmitting the same data from each antenna of the first transceiver unit and controlling the direction of the transmitted data according to the properties of a radio channel.

The invention provides several advantages. While providing a MIMO data transmission scheme which introduces a low peak-to-average power ratio (PAR) of a transmitted signal, the invention provides increased data throughput compared to other low PAR MIMO data transmission schemes.

LIST OF DRAWINGS

In the following, the invention will be described in greater detail with reference to the embodiments and the accompanying drawings, in which FIG. 1 illustrates a telecommunication system and structures of a mobile subscriber unit and a base station according to an embodiment of the invention;

DESCRIPTION OF EMBODIMENTS

Figure 1:
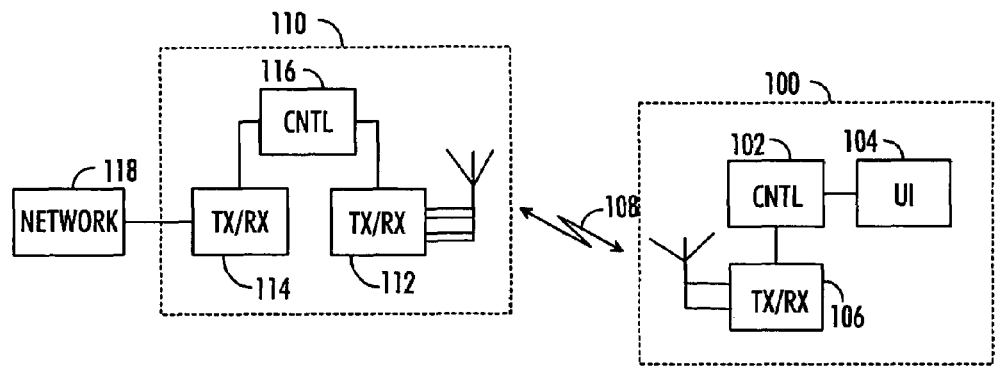

With reference to FIG. 1, let us examine an example of a telecommunication system to which embodiments of the invention can be applied. A mobile subscriber unit 100 communicates wirelessly with a base station 110 over a wireless communication link 108. The communication may be based on code division multiple access (CDMA) technology but the invention is not limited to that.

The mobile subscriber unit 100 comprises a communication interface 106 to transmit and receive information signals transmitted over the communication link 108. The communication interface 106 comprises a plurality of antennas for enabling multiple input multiple output (MIMO) transmission and reception of signals.

The mobile subscriber unit 100 further comprises a control unit 102 to control functions of the mobile subscriber unit 100. The control unit 102 handles establishment, operation and termination of radio connections in the mobile subscriber unit 100. The control unit 102 also controls the data transmission parameters of the mobile subscriber unit 100. Additionally the control unit 102 controls reception of information by controlling the processing of reception signals. The control unit 102 may be implemented by a digital signal processor with suitable software embedded in a computer readable medium, or by separate logic circuits, for example with ASIC (Application Specific Integrated Circuit).

The mobile subscriber unit 100 may further comprise a user interface 104 connected to the control unit 102. The user interface 104 may comprise a keyboard or a keypad, a display, a microphone, and/or a loudspeaker.

The base station 110 may be a base transceiver station of a mobile communication system such as UMTS (Universal Mobile Telecommunications System) or an access point to WLAN (Wireless Local Area Network). The base station 110 comprises a first communication interface 112 to provide an air interface connection 108 to one or several mobile subscriber units 100. The first communication interface comprises a plurality of antennas for enabling MIMO transmission and reception of signals.

The base station 110 further comprises a second communication interface 114 to provide a wired connection to the network 118 of the telecommunication system. The network of the telecommunication system may provide connections to other networks, such as the Internet.

The base station 110 further comprises a control unit 116 to control functions of the base station 110. The control unit 116 handles establishment, operation and termination of radio connections with the mobile subscriber units 100 the base station 110 is serving. The base station 110 also provides mobile subscriber units 100 with information related to the data transmission from the mobile subscriber units 100. The information may comprise information on which transmission scheme and/or transmission parameters the mobile subscriber unit 100 should use in data transmission. The information may also comprise transmit power control information instructing the mobile subscriber unit 100 to increase or decrease its transmit power. The control unit 116 may be implemented by a digital signal processor with suitable software embedded in a computer readable medium, or by separate logic circuits, for example with ASIC (Application Specific Integrated Circuit).

Figure 2:
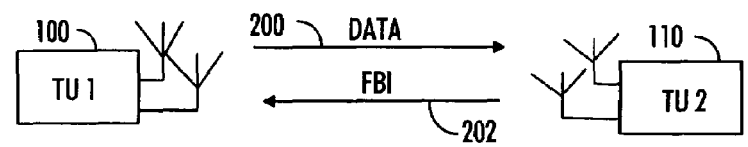
FIG. 2 illustrates uplink data transfer between the mobile subscriber unit and the base station according to an embodiment of the invention.
Figure 3:
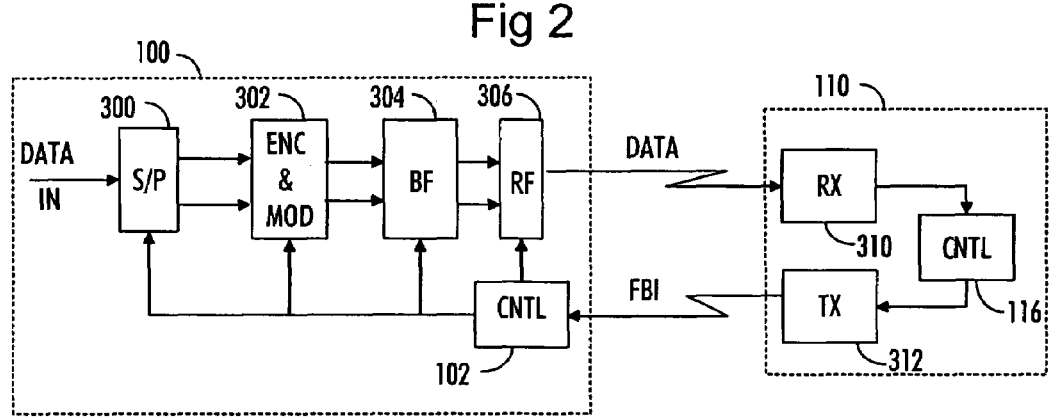
FIG. 3 illustrates uplink data transfer of FIG. 2 in more detail.

Next, a data transmission scheme according to an embodiment of the invention will be described with a reference to FIGS. 2 and 3. FIG. 2 illustrates a simplified data transmission scheme according to the embodiment between a first transceiver unit (a mobile subscriber unit 100 in this example) and a second transceiver unit (a base station 110 in this example). The embodiment described herein refers to uplink data transmission but the data transmission scheme may as well be implemented into downlink data transmission.

The first transceiver unit 100 transmits data to the second transceiver unit 110 by utilizing a plurality of antennas of the first transceiver unit 100 for MIMO transmission. The first transceiver unit 100 may transmit data according to two different MIMO transmission schemes. The first MIMO transmission scheme is a transmission scheme in which the first transceiver unit 100 transmits different data from each antenna. The data to be transmitted is multiplexed into a number of independent data streams, the number of data streams depending on the number of transmit antennas in the first transceiver unit 100. Because several independent signals are not summed with respect to the signal to be transmitted from one antenna, the peak-to-average power ratio (PAR) of the transmitted signal remains substantially low and the efficiency of an RF amplifier of the first transceiver unit 100 is substantially high. This data transmission scheme is sometimes referred to as the information MIMO technique, and it is particularly advantageous in environments in which the signal-to-noise ratio (SNR) is high in a receiver and/or the transmitter antenna correlation properties are substantially low. In such an environment, the receiver is able to detect the two different transmitted signals and data throughput is increased in comparison to situation where only one data signal was transmitted. The data transmission scheme will be described in more detail below.

Another data transmission scheme the first transceiver unit 100 may use for transmitting data to the second transceiver unit 110 is based on controlling the direction of the transmitted signal. According to this data transmission scheme, the same data is transmitted from each antenna of the first transceiver unit, and the direction of the transmitted signal is controlled by adjusting the phase and the amplitude of signals transmitted from each antenna. With this data transmission scheme too, one data stream, i.e. one information signal, is transmitted from each antenna and, therefore, PAR of the transmitted signal remains substantially low and the efficiency of an RF amplifier of the first transceiver unit 100 is substantially high. This data transmission scheme is sometimes referred to as spatial beamforming, and it is particularly advantageous in environments in which SNR is substantially low in the receiver and/or transmit antenna correlation is substantially high. The low SNR may be due to the properties of a radio channel, for example. In such an environment, increased reliability and data throughput may be achieved by directing the transmitted signal into a proper direction such that the transmitted signal propagates through a signal path with substantially low attenuation and/or few multipath components. This data transmission scheme will be described in more detail below.

In addition to the two data transmission schemes described above, the first transceiver unit 100 may use other data transmission schemes for transmitting data to the second transceiver unit 110. Another data transmission scheme may utilize a scheme known in the art as space-time transmit diversity (STTD). According to this data transmission scheme, the transmitted data may be space-time coded and transmitted through the plurality of transmit antennas with diversity. Space-time block codes may be used for space-time coding, for example. Space-time transmit diversity improves the reliability of the data transmission by adding diversity to the transmission.

Referring to FIG. 2, the first transceiver unit 100 transmits data according to a determined data transmission scheme to the second transceiver unit on an uplink data channel 200. The second transceiver unit 110 analyses the received data, and calculates specific parameters from the received data. Then, the second transceiver unit 110 determines the data transmission scheme to be used by the first transceiver unit 100 based on the calculated parameters and transmits the corresponding information to the first transceiver unit 100 as feedback information on a downlink control channel 202. The specific parameters may indicate the quality of a communication link, i.e. uplink data channel 200, between the first and the second transceiver unit 100, 110 and information on correlation properties of antennas of the first transceiver unit 100. Additionally, the second transceiver unit 110 may determine other parameters concerning the data transmission of the first transceiver unit 100. Such parameters may include a direction to which the first transceiver unit 100 should transmit its signals and/or transmit power control information. These additional parameters may also be transmitted to the first transceiver unit 100 as feedback information on a downlink control channel 202. Upon reception of the feedback information, the first transceiver unit 100 either changes or maintains the data transmission scheme it was using depending on the feedback information related to the data transmission scheme. Additionally, the first transceiver unit 100 may adjust the direction it is transmitting data based on the received feedback information and/or adjust the transmission power level. The above procedure is repeated periodically in order to provide data transmission capable of adapting to a changing radio environment and yet maintaining efficient data throughput with low PAR of the transmitted signal.

Next, the data transmission according to an embodiment of the invention will be described in more detail referring to FIG. 3. FIG. 3 illustrates the data transmission blocks of the first transceiver unit 100, blocks for determining data transmission parameters for the first transceiver unit 100 in the second transceiver unit 110, and the flow of information between the transceiver units 100, 110 via an air interface.

In the first transceiver unit 100, a serial-to-parallel conversion block 300 converts the input data in a serial form into a parallel form under the control of the control unit 102. The input data may be a data bit stream coming from other components of the first transceiver unit 100. According to an input from the control unit 102, the serial-to-parallel converter 300 may multiplex the input data stream into multiple independent output data streams. This means that each output data stream comprises different data than the other output data stream or streams. Alternatively, the serial-to-parallel converter 300 may copy an input data stream into multiple output data streams. This means that each output data stream comprises the same data as the other output data stream or streams.

The output of the serial-to-parallel converter 300 is coupled to an encoder and modulator unit 302. The encoder and modulator unit 302 carries out the encoding and modulation of input data streams under the control of the control unit 102. The encoder and modulator unit 302 may carry out the encoding and modulation for each input data stream independently according to an indication from the control unit 102 which indicates the encoding and modulation scheme to use. This means that each input data stream is encoded and modulated separately and independently of other input data streams. The encoding may comprise the channel encoding of the input data stream, and the modulation may comprise the modulation of the input data stream according to a symbol constellation indicated by the control unit 102. Additionally, the encoder and modulator unit 302 may carry out interleaving, spreading, and/or other processing on the input data stream. Alternatively, the encoder and modulator unit 302 may carry out encoding and modulation (and other processing) for each independent data stream jointly by employing space-time block coding and/or space-time modulation, for example. Interleaving may also be carried out over time and over each data stream such that a specific amount of data from each data stream is included in one interleaving operation.

The encoder and modulator 302 may operate adaptively under the control of the control unit 102. Consequently, the encoding, modulation, spreading and/or interleaving operations may be carried out by the encoder and modulator unit 302 adaptively according to the instructions from the control unit 102. The encoding may be carried out adaptively by adjusting the code rate of the encoding process during the data transmission, thus affecting the robustness of the data transmission against errors introduced in the data in the radio channel. The modulation may be carried out adaptively by changing the modulation scheme according to the desired properties of the transmitted signal. In the selection of the modulation scheme, a trade-off is made between the data throughput and robustness of the data transmission.

Spreading may be made adaptive through the selection of a spreading code for each data stream. When using the information MIMO transmission scheme, the control unit 102 may assign different spreading codes for each independent data stream and control the spreading factor of each data stream on a frame-by-frame basis. When using the spatial beamforming data transmission scheme, the control unit 102 may select the same spreading factor for each data stream and control the spreading factor of each data stream jointly on a frame-by-frame basis. This means that each data stream employs the same spreading code and spreading factor in each transmitted frame.

Related to the interleaving process, the control unit may select the dimensions of the interleaving process (i.e. the size of the interleaving matrix) and whether or not to employ space-time interleaving. The adjustments described above may be carried out on a frame-by-frame basis.

From the encoder and modulator unit 302, the parallel data streams are directed to a beamforming unit 304. The beamforming unit adjusts the phases and amplitudes of the parallel data streams in order to control the direction of a transmitted signal. The beamforming unit 304 may receive control information comprising the direction of transmission from the control unit 102.

From the beamforming unit 304, the parallel data streams are directed to a radio frequency (RF) unit 306 which carries out the conversion of the parallel data streams into radio frequency, filtering, amplification, and transmission of the RF signals with each parallel RF signal being transmitted in frames from each antenna of the first transceiver unit 100 to the second transceiver unit 110.

The second transceiver unit 110 receives the transmitted signal through its reception unit 310. The reception unit 310 receives the signal through its plurality of antennas and carries out necessary operations for detecting the transmitted data from the signals received through each antenna. Such operations may comprise filtering and downconversion from RF. The downconverted signals are then fed to a control unit 116 which performs despreading, demodulation, detection and other signal processing operations in order to detect the transmitted data streams. The transmitted frames may comprise information on the data transmission scheme used for the transmission of the frames.

A transmitted frame may comprise pilot symbols. The second transceiver unit 110 may use the pilot symbols for calculating the properties of the radio channel and effects of the radio channel on the transmitted signal. The received pilot symbols transmitted at time n from the transmit antennas may be defined with the following equation:

$$y(n)=Hx(n)+w(n), \quad (1)$$

where y(n) is the received symbol vector comprising the symbols received through each receiver antenna in the second transceiver unit 110, H is a channel matrix representing a radio channel gain from each transmitter (the first transceiver unit) antenna to each receiver (the second transceiver unit) antenna, x(n) is a vector comprising the transmitted symbols and w(n) represents the noise vector. The size of vector y(n) is equivalent to the number of receiver antennas in the second transceiver unit 110, the size of vector x(n) is equivalent to the number of transmit antennas in the first transceiver unit 100. Let us denote the number of transmit antennas with $M_t$ and the number of receiver antennas with $M_r$. The size of channel matrix H is then $M_t \times M_r$.

In order to determine the quality of the communication link between the first and the second transceiver unit, the control unit 116 may calculate the signal-to-noise ratio (SNR) or signal-to-interference-plus-noise ratio (SINR) of the received signal and a transmitter antenna covariance matrix from the received pilot symbols. The covariance matrix contains information on the correlation properties of transmitter antennas. SNR or SINR may be calculated according to an algorithm known in the art and the transmitter antenna covariance matrix may be calculated with the following equation:

$$R_{TX}=E[H^K H], \quad (2)$$

where K denotes the complex conjugate transpose matrix and E[·] denotes the expected value. The control unit 116 may also perform eigenvalue decomposition on the channel matrix as:

$$H=\Lambda_Z \Lambda_Q \Lambda_Z^K, \quad (3)$$

where $\Lambda_Z$ is a unitary matrix comprising the eigenvectors of channel matrix H and $\Lambda_Q$ is a diagonal matrix comprising the eigenvalues of channel matrix H in a descending order. The eigenvalues of matrix $\Lambda_Q$ may be used for determining transmission parameters for the first transceiver unit 100. For example, the most promising transmit direction may be determined on the basis of the values of the diagonal elements of eigenvalue matrix $\Lambda_Q$, and the data transmission scheme to be used by the first transceiver unit 100 may also be determined by utilizing the eigenvalue matrix. The eigenvalue decomposition actually extracts channel matrix H into portions which describe orthogonal sub-channels of the radio channel and the attenuation associated with each orthogonal sub-channel. The orthogonal sub-channels are defined by the vectors of eigenvector matrix $\Lambda_Z$ and the attenuation associated with each sub-channel is defined by the diagonal values of eigenvalue matrix $\Lambda_Q$.

Next, the determination of the data transmission scheme for the first transceiver unit according to an embodiment of the invention will be described. As mentioned above, eigenvalue matrix $\Lambda_Q$ may be utilized when determining the most suitable data transmission scheme. In short, a maximum achievable data transfer capacity is calculated for each data transmission scheme and the data transmission scheme providing the highest capacity is selected. The maximum achievable data transfer capacity for each data transmission scheme may be calculated through approximation of the following equation for ergodic capacity:

$$\tilde{C} = \frac{B}{L_B} E\left\{\log_2\left[\det\left(I + \frac{1}{N_0 B} H_t R_{TX}^{1/2} \Lambda_Q R_{TX}^{1/2} H_t^K\right)\right]\right\}, \quad (4)$$

where B is the bandwidth of the received signal, $L_B$ is the total length of the considered time interval in symbols (for example the number of symbols in a frame, if one frame period is considered), I is a unity matrix, and $N_0$ is the noise power density (may be determined through SNR estimation). Instead of SNR, SINR may be used. In that case, $N_0 B$ in equation (4) will be replaced with $N_0 B + P_i$ where $P_i$ represents the estimated interference power. Matrix $H_t$ is a channel matrix comprising channel sub matrices which have been formed by including a plurality of pilot symbols in channel matrix $H_t$ and, thus, channel matrix $H_t$ has the following structure:

$$H_t = \begin{pmatrix} H^{(1,1)} & H^{(1,2)} & \cdots & H^{(1,M_t)} \\ H^{(2,1)} & H^{(2,2)} & \cdots & H^{(2,M_t)} \\ \vdots & \vdots & \ddots & \vdots \\ H^{(M_r,1)} & H^{(M_r,2)} & \cdots & H^{(M_r,M_t)} \end{pmatrix}, \quad (5)$$

where each sub matrix H( ) is the channel convolution matrix defined by the corresponding channel impulse response vector for each pilot symbol included in the capacity calculation. The above equations (4) and (5) and the corresponding capacity calculations have been considered for theoretical purposes in the following publication which has been included herein as a reference: S. A. Jafar, S. Vishwanath and A. Goldsmith, "Channel Capacity and Beamforming for Multiple Transmit and Receive Antennas with Covariance Feedback", Proceedings of IEEE ICC'2001, vol. 7, pp. 2266-2270, June 2001.

For implementation, the ergodic capacity equation of equation (4) may be approximated as:

$$\tilde{C} \approx \frac{\log_2(e) L_M B}{L_B} \sum_{j=1}^{M_t} \sum_{i=0}^{M_r - 1} \frac{\Gamma\left(i, \frac{1}{\alpha_j}\right) \Gamma\left(M_r - i, \frac{1}{\alpha_j}\right)}{i!(M_r - i - 1)!}, \quad (6)$$

where e is a constant 2.71828, $L_M$ is the number of pilot symbols used in the calculation of the capacity, $\Gamma$ is a gamma function commonly known in the art, i and j are indices and $\alpha_j$ is a parameter defined by the following equation:

$$\alpha_j = \frac{z_j q_j}{N_0 B}, \quad (7)$$

where $z_j$ is the $j^{th}$ eigenvalue of eigenvalue matrix $\Lambda_Q$, $q_j$ is a power scaling factor defining how much transmit power is associated with each eigenvalue in the transmission. Power scaling factor $q_j$ is determined according to the data transmission scheme for which the capacity is being calculated as described below. Again, if SINR is used instead of SNR, interference power $P_i$ is added to the denominator of equation (7).

When calculating a maximum achievable data transfer capacity for the information MIMO data transmission scheme, i.e. the scheme in which independent data is transmitted from each transmit antenna, power scaling factor $q_j$ may be set to be the same for each eigenvalue $z_j$ and the value for $q_j$ for every value of index j may be set according to the following equation:

$$q_j = \frac{1}{M_t} P, \quad (8)$$

where P is the total transmit power of the first transceiver unit and may be determined from the power control information of the first transceiver unit. With these parameters, a capacity value is calculated for the information MIMO data transmission scheme and a first capacity value is obtained. The reason for setting power scaling factor $q_j$ to constant for each eigenvalue is that in the first transceiver unit 100 independent data is transmitted from each antenna and the same amount of power is allocated for each sub-channel (each sub-channel being represented by an eigenvalue) regardless of the properties of the sub-channel. Therefore, the constant values of power scaling factor $q_j$ represent the situation in which equal amount of power is allocated to each sub-channel.

When calculating a maximum data transfer capacity for the spatial beamforming data transmission scheme, i.e. the scheme in which the same data is transmitted from each transmit antenna and the direction of the transmission is controlled, power scaling factor $q_j$ is set to P for the highest eigenvalue $z_j$ and zero for other eigenvalues. With these parameters, a capacity value is calculated for the spatial beamforming data transmission scheme and a second capacity value is obtained. The reason for setting power scaling factor $q_j$ to P for the highest eigenvalue and zero for others is that this corresponds to the spatial beamforming scheme. In spatial beamforming scheme, the total transmit power is focused on one sub-channel, i.e. the sub-channel associated with the highest eigenvalue.

According to the procedure described above, capacity values for other data transmission schemes may also be calculated. The obtained capacity values are then compared, and the data transmission scheme providing the highest capacity value is selected. The selected data transmission scheme is then transmitted back to the first transceiver unit 100 through a transmitter unit 312 of the second transceiver unit 110 as feedback information. The transmitter unit carries out necessary procedures for the transmission of the information over the air interface. The transmitter unit 312 may use at least partly the same components as the reception unit 310. In addition to the selected data transmission scheme, the second transceiver unit 110 may transmit other control information to the first transceiver unit 100. Particularly, if the spatial beamforming data transmission scheme was selected, the second transceiver unit 110 may transmit the eigenvector corresponding to the highest eigenvalue. Alternatively, the second transceiver unit 110 may transmit eigenvector matrix $\Lambda_Z$ and eigenvalue matrix $\Lambda_Q$ to the first transceiver unit 100 regardless of the selected data transmission scheme. Additionally, the second transceiver unit 110 may transmit power control and other information related to transmission parameters to the first transceiver unit 100.

The control unit 102 of the first transceiver unit 100 receives (through a communication interface not illustrated in FIG. 3) the information related to the data transmission scheme and to other transmission parameters. Then, the control unit 102 selects the data transmission scheme to be used in the transmission according to the received information in order to control the transmission of the next data frame. If the control unit 102 receives information that the information MIMO data transmission scheme is to be used, the control unit 102 instructs the serial-to-parallel conversion unit 300 to convert the input data stream into parallel data streams with each data stream comprising different data, the encoding and modulation unit 302 to carry out specific encoding and modulation to the input data streams, and the RF unit 306 to amplify the parallel signals in transmission to a specific power level.

On the other hand, if the control unit 102 receives information that the spatial beamforming data transmission scheme is to be used, the control unit 102 instructs the serial-to-parallel conversion unit 300 to convert the input data stream into parallel data streams with each data stream comprising the same data, the encoding and modulation unit 302 to carry out specific encoding and modulation to the input data streams, beamforming unit 304 to adjusts the phases and the amplitudes of the parallel data streams according to the input from the control unit 102, and the RF unit 306 to amplify the parallel signals in transmission to a specific power level. The control unit 102 may control the beamforming unit 304 according to received eigenvector matrix $\Lambda_Z$ and eigenvalue matrix $\Lambda_Q$. The control unit 102 may control the beamforming unit 304 to control the phases and amplitudes of the input data streams of the beamforming unit such that the signal in transmission will be transmitted to the sub-channel corresponding to the highest eigenvalue of eigenvalue matrix $\Lambda_Q$. The sub-channel is defined by the eigenvector associated with the highest eigenvalue.

The second transceiver unit 110 may determine a data transmission scheme for the first transceiver unit 100 to use in data transmission on a frame-by-frame basis. Transmit antenna covariance properties, however, usually change rather slowly and, therefore, the determination of the data transmission scheme may be carried out less frequently, for example at five-frame intervals. In comparison with the frame duration in UMTS, this would correspond to a 50-ms time interval. Typically, there is a certain delay before a change in the used data transmission scheme takes place. The delay may be caused by the time used for calculations and signal processing operations carried out in both the first and the second transceiver unit 100 and 110 and for the signal propagation in the radio channel.

According to another embodiment of the invention, the data transmission scheme to be used may be determined on the basis of measured and/or simulated properties of different radio links. Radio links with different properties may be simulated and/or measured and specific parameters may be obtained for each measured and/or simulated radio link. Such parameters may comprise transmit antenna covariance information and SNR in a receiver, for example. On the basis of the measurements and/or simulations, parameters corresponding to a radio link may be stored into a look-up table together with an indication of which data transmission scheme would be most suitable for the radio link. When determining the data transmission scheme to be used, the parameter values obtained from the received signal may be compared with the corresponding parameter values in the look-up table. The data transmission scheme associated to the parameter values that are closest to the parameter values obtained from the received signal may then be selected for the data transmission scheme to be used.

Figure 4:
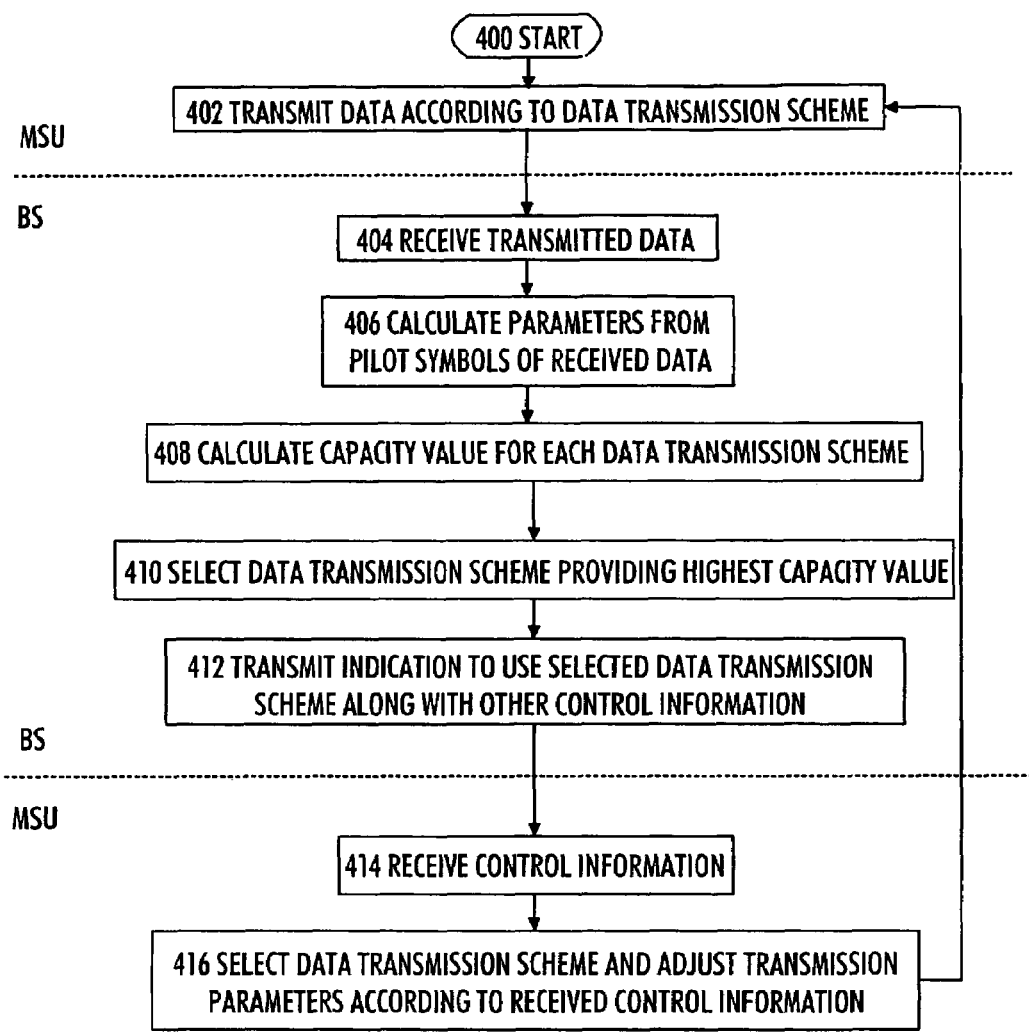
FIG. 4 is a flow diagram illustrating a data transmission method according to an embodiment of the invention.

Next, data transmission according to an embodiment of the invention will be described with reference to a flow diagram in FIG. 4. The process starts in block 400. In block 402, a mobile subscriber unit (MSU) transmits data to a base station (BS) according to a determined data transmission scheme. For example, let us assume that data is transmitted first according to the information MIMO data transmission scheme through a plurality of antennas in MSU.

BS receives the transmitted data through its plurality of antennas in block 404. BS may then perform operations such as despreading, demodulation, detection, and other signal processing operations on the received data. BS calculates specific parameters from the pilot symbols of the received data in block 406. Such parameters may comprise transmitter (MSU) antenna correlation information, SNR of the received signal, channel matrix, and eigenvalue decomposition of the channel matrix. On the basis of the calculated parameters, BS calculates a capacity value for each data transmission scheme available for use in MSU. This operation is carried out in block 408. In block 410, the data transmission scheme providing the highest capacity value is selected as the data transmission scheme to be used. For example, let us assume that the spatial beamforming data transmission scheme provides the highest capacity value and is therefore selected. BS then transmits an indication of the selected data transmission scheme to MSU together with other control information in block 412. The other control information may comprise an eigenvector indicating a direction into which MSU should transmit its data and/or power control information.

MSU receives the control information in block 414. In step 416, MSU selects the data transmission scheme and adjusts the transmission parameters as indicated by the control information. According to the received control information, MSU may either change or maintain the currently used data transmission scheme. If MSU maintains the currently used data transmission scheme, MSU may still adjust the transmission parameters according to the received control information. In our example, MSU receives information that it should change from the information MIMO data transmission scheme to the spatial beamforming data transmission scheme. MSU the selects the spatial beamforming and defines the transmission parameters accordingly for the next frame to be transmitted. From block 416, the process returns to step 402 in which MSU transmits data according to the determined data transmission scheme.

The embodiments of the invention may be realized in a transceiver unit comprising a communication interface and a control unit operationally connected to the communication interface. The control unit may be configured to perform at least some of the steps described in connection with the flowchart of FIG. 4 and in connection with FIGS. 2 and 3. The embodiments may be implemented as computer programs comprising instructions for executing a computer process for data transmission.

The computer program may be stored on a computer program distribution medium readable by a computer or a processor. The computer program medium may be, for example but not limited to, an electric, magnetic, optical, infrared, or semiconductor system or device. The medium may be a computer readable medium, a program storage medium, a record medium, a computer readable memory, a random access memory, an erasable programmable read-only memory, a computer readable software distribution package, and a computer readable compressed software package.

Even though the invention has been described above with reference to an example according to the accompanying drawings, it is clear that the invention is not restricted thereto but it can be modified in several ways within the scope of the appended claims.

The invention claimed is:

1. A method, comprising:
selecting, during an active communication link between a first and a second transceiver, a multi-antenna data transmission scheme for the first transceiver based on a quality of the communication link and transmit antenna correlation information associated with the first transceiver, wherein the multi-antenna data transmission scheme is selected amongst at least the two following multi-antenna data transmission schemes,
transmitting different data from each antenna of the first transceiver, wherein data transmitted from one antenna is independent of data transmitted from another antenna, and
transmitting identical data from each antenna of the first transceiver and controlling direction of the transmitted identical data according to properties of a radio channel.

2. The method of claim 1, further comprising determining, in the second transceiver, the quality of the communication link by calculating a signal-to-noise ratio or signal-to-interference-plus-noise ratio of a signal received from the first transceiver.

3. The method of claim 1, further comprising:
receiving, in the second transceiver, a pilot signal transmitted from the first transceiver;
calculating a signal-to-noise ratio and antenna correlation information of the first transceiver from the received pilot signal;
selecting the multi-antenna data transmission scheme for the first transceiver based on the calculated signal-to-noise ratio and first transceiver antenna correlation information; and
transmitting information on the selected multi-antenna data transmission scheme to the first transceiver.

4. The method of claim 3, further comprising:
calculating a maximum data transfer capacity for each multi-antenna data transmission scheme based on the calculated signal-to-noise ratio and first transceiver antenna correlation information; and
selecting the multi-antenna data transmission scheme resulting in a highest maximum data transfer capacity.

5. The method of claim 4, wherein the calculating the maximum data transfer capacity for each multi-antenna data transmission scheme comprises,
calculating a first transceiver antenna covariance matrix from the received pilot signal;
calculating eigenvalue decomposition for the first transceiver antenna covariance matrix to obtain an eigenvalue matrix and an eigenvector matrix;
setting eigenvalues equal when calculating the maximum data transfer capacity for the transmission scheme of transmitting different data from each antenna of the first transceiver; and
setting all other eigenvalues except an eigenvalue having the largest value, to zero when calculating the maximum data transfer capacity for the transmission scheme of transmitting the same data from each antenna of the first transceiver and controlling the direction of the transmitted data according to the properties of a radio channel.

6. The method of claim 1, wherein the multi-antenna data transmission scheme of transmitting different data from each antenna of the first transceiver comprises:
allocating different data to be transmitted from each antenna of the first transceiver by converting a data stream in a serial form into several data streams in a parallel form with each data stream comprising different data, wherein a number of parallel data streams corresponds to a number of antennas in the first transceiver; and
transmitting each parallel data stream through a different antenna.

7. The method of claim 1, further comprising controlling a direction of transmission of the first transceiver according to transmit direction information received from the second transceiver.

8. The method of claim 1, wherein the multi-antenna data transmission scheme of transmitting the same data from each antenna of the first transceiver and controlling the direction of the transmitted data according to the properties of a radio channel comprises,
allocating identical data to be transmitted from each antenna of the first transceiver by copying a data stream into several data streams, wherein a number of data streams corresponds to a number of antennas in the first transceiver; and
controlling a direction of transmission according to transmit direction information received from the second transceiver.

9. The method of claim 7, further comprising:
calculating, in the second transceiver, eigenvalue decomposition for the first transceiver antenna covariance matrix to obtain an eigenvalue matrix and an eigenvector matrix;
selecting an eigenvector associated with a highest eigenvalue of the eigenvalue matrix; and
controlling the first transceiver to transmit data into at least one direction indicated by the selected eigenvector.

10. An apparatus, comprising:
a communication interface comprising a plurality of antennas configured to transmit and receive information signals; and
a controller operably connected to the communication interface, the controller being configured to select a multi-antenna data transmission scheme based on multi-antenna data transmission scheme information received from a transceiver, and to transmit data through the communication interface according to the selected multi-antenna data transmission scheme, wherein the multi-antenna data transmission scheme is selected amongst at least the two following multi-antenna data transmission schemes, transmitting different data from each antenna of the communication interface, wherein data transmitted from one antenna is independent of data transmitted from another antenna, and transmitting identical data from each antenna of the communication interface and controlling a direction of the transmitted identical data according to properties of a radio channel.

11. The apparatus of claim 10, wherein, upon selecting the multi-antenna data transmission scheme of transmitting different data from each antenna of the communication interface, the controller is further configured to allocate different data to be transmitted from each antenna of the apparatus by converting a data stream in a serial form into several data streams in a parallel form with each parallel data stream comprising different data, wherein a number of lower datarate data streams corresponds to a number of antennas in the apparatus, and to transmit each parallel data stream through a different antenna.

12. The apparatus of claim 11, wherein the controller is further configured to control the direction of transmission of the apparatus according to transmit direction information received from the transceiver.

13. The apparatus of claim 10, wherein, upon selecting the transmission scheme to transmit the same data from each antenna of the communication interface and control the direction of the transmitted data according to the properties of a radio channel, the controller is further configured to allocate identical data to be transmitted from each antenna of the apparatus by copying a data stream into several data streams, wherein a number of data streams corresponds to a number of antennas in the apparatus, and to control the direction of transmission according to transmit direction information received from the transceiver.

14. The apparatus of claim 12, wherein the controller is further configured to receive, through the communication interface from the transceiver, an eigenvector indicating at least one direction into which data should be transmitted, and to transmit data into the at least one direction indicated by the eigenvector.

15. An apparatus, comprising:
a communication interface comprising a plurality of antennas configured to transmit and receive information signals; and
a controller operably connected to the communication interface, the controller being configured to select, during an active communication link with a transceiver, a multi-antenna data transmission scheme for the transceiver based on a quality of the communication link, and to transmit antenna correlation information associated with the transceiver, the multi-antenna data transmission scheme being selected amongst at least the two following multi-antenna data transmission schemes,
transmitting different data from each antenna of the transceiver, wherein data transmitted from one antenna is independent of data transmitted from another antenna, and
transmitting identical data from each antenna of the transceiver and controlling a direction of the transmitted identical data according to properties of a radio channel.

16. The apparatus of claim 15, wherein the controller is further configured to determine a quality of the communication link by calculating a signal-to-noise ratio or signal-to-interference-plus-noise ratio of a signal received from the transceiver.

17. The apparatus of claim 15, wherein the controller is further configured to receive a pilot signal transmitted from the transceiver, to calculate signal-to-noise ratio and antenna correlation information of the transceiver from the received pilot signal, to select the multi-antenna data transmission scheme for the transceiver based on the calculated signal-to-noise ratio and the transceiver antenna correlation information, and to transmit information on the selected multi-antenna data transmission scheme to the transceiver.

18. The apparatus of claim 17, wherein the controller is further configured to calculate a maximum data transfer capacity for each multi-antenna data
transmission scheme based on the calculated signal-to-noise ratio and antenna correlation information of the transceiver, and to select the multi-antenna data transmission scheme resulting in a highest maximum data transfer capacity.

19. The apparatus of claim 18, wherein the controller is further configured to calculate an antenna covariance matrix of the transceiver from the received pilot signal, to calculate at least one eigenvalue decomposition for the antenna covariance matrix of the transceiver, and to obtain an eigenvalue matrix and an eigenvector matrix,
wherein the eigenvalues are equal when calculating the maximum data transfer capacity for the transmission scheme of transmitting different data from each antenna of the transceiver, and
wherein all eigenvalues but a largest one are set to zero when calculating the maximum data transfer capacity for the transmission scheme of transmitting the same data from each antenna of the transceiver and controlling the direction of the transmitted data according to the properties of a radio channel.

20. A system, comprising:
a first transceiver; and
a second transceiver in communication with the first transceiver,
wherein the first transceiver includes a communication interface comprising a plurality of antennas configured to transmit and receive information signals, and a controller operably connected to the communication interface, the controller of the first transceiver being configured to select a multi-antenna data transmission scheme based on multi-antenna data transmission scheme information received from the second transceiver and transmit data through the communication interface according to the selected multi- antenna data transmission scheme, and
wherein the second transceiver includes a communication interface comprising a plurality of antennas configured to transmit and receive information signals, and a controller operably connected to the communication interface, the controller of the second transceiver being configured to select, during an active communication link between the first and the second transceiver, a multi-antenna data transmission scheme for the first transceiver based on a quality of the communication link and transmit antenna correlation information associated with the first transceiver, the multi-antenna data transmission scheme being selected amongst at least the two following multi-antenna data transmission schemes,
transmitting different data from each antenna of the first transceiver, wherein data transmitted from one antenna is independent of data transmitted from another antenna, and transmitting identical data from each antenna of the first transceiver and controlling a direction of the transmitted identical data according to properties of a radio channel.

21. An apparatus, comprising:
a communication interface comprising a plurality of antennas configured to transmit information signals; and
a controller operably connected to the communication interface, the controller being configured to select a multi-antenna data transmission scheme based on multi-antenna data transmission scheme selection instructions and to transmit data through the communication interface according to the selected multi-antenna data transmission scheme, the multi-antenna data transmission scheme being selected amongst at least the two following multi-antenna data transmission schemes,
transmitting different data from each antenna of the communication interface, wherein data transmitted from one antenna is independent of data transmitted from another antenna, and
transmitting identical data from each antenna of the communication interface and controlling direction of the transmitted identical data according to the properties of a radio channel.

22. An apparatus, comprising:
a communication interface comprising a plurality of antennas configured to receive information signals; and
a controller operably connected to the communication interface, the controller being configured to select, during an active communication link with a transmitter, a multi-antenna data transmission scheme for the transmitter based on a quality of the communication link and transmit antenna correlation information associated with the transmitter, wherein the multi-antenna data transmission scheme is selected amongst at least the two following multi-antenna data transmission schemes,
transmitting different data from each antenna of the transmitter, wherein data transmitted from one antenna is independent of data transmitted from another antenna, and
transmitting identical data from each antenna of the transmitter and controlling direction of the transmitted identical data according to the properties of a radio channel.

23. An apparatus, comprising:
communication means comprising a plurality of antennas for transmitting and receiving information signals; and
means for selecting a multi-antenna data transmission scheme based on multi-antenna data transmission scheme information received from a transceiver and means for transmitting data through the communication means according to the selected multi-antenna data transmission scheme, wherein the multi-antenna data transmission scheme is selected amongst at least the two following multi-antenna data transmission schemes,
transmitting different data from each antenna of the communication means, wherein data transmitted from one antenna is independent of data transmitted from another antenna, and
transmitting identical data from each antenna of the communication means and controlling a direction of the transmitted identical data according to properties of a radio channel.

24. An apparatus, comprising:
communication means comprising a plurality of antennas for transmitting and receiving information signals; and
means for selecting, during an active communication link with a transceiver, a multi-antenna data transmission scheme for the other transceiver based on a quality of the communication link and means for transmitting antenna correlation information associated with the other transceiver, wherein the multi-antenna data transmission scheme is selected amongst at least the two following multi-antenna data transmission schemes,
transmitting different data from each antenna of the other transceiver, wherein data transmitted from one antenna is independent of data transmitted from another antenna, and
transmitting identical data from each antenna of the other transceiver and controlling a direction of the transmitted identical data according to properties of a radio channel.

25. An apparatus, comprising:
communication means comprising a plurality of antennas for transmitting information signals; and
means for selecting a multi-antenna data transmission scheme based on multi-antenna data transmission scheme selection instructions; and
means for transmitting data through the communication means according to the selected multi-antenna data transmission scheme, wherein the multi-antenna data transmission scheme is selected amongst at least the two following multi-antenna data transmission schemes,
transmitting different data from each antenna of the communication means, wherein data transmitted from one antenna is independent of data transmitted from another antenna, and
transmitting identical data from each antenna of the communication means and controlling direction of the transmitted data according to properties of a radio channel.

26. An apparatus, comprising:
communication means comprising a plurality of antennas for receiving information signals; and
means for selecting, during an active communication link with a transmitter, a multi-antenna data transmission scheme for the transmitter based on a quality of the communication link and transmit antenna correlation information associated with the transmitter, wherein the multi-antenna data transmission scheme is selected amongst at least the two following multi-antenna data transmission schemes,
transmitting different data from each antenna of the transmitter, wherein data transmitted from one antenna is independent of data transmitted from another antenna, and
transmitting identical data from each antenna of the transmitter and controlling a direction of the transmitted data according to properties of a radio channel.

27. A computer program embodied on a computer program medium readable by a computer or a processor comprising computer code for executing a computer process for data transmission in a telecommunication system, the process comprising:
selecting, during an active communication link between a first and a second transceiver, a multi-antenna data transmission scheme for the first transceiver based on a quality of the communication link and transmit antenna correlation information associated with the first transceiver, wherein the multi-antenna data transmission scheme is selected amongst at least the two following multi-antenna data transmission schemes,
transmitting different data from each antenna of the first transceiver, wherein data transmitted from one antenna is independent of data transmitted from another antenna, and transmitting identical data from each antenna of the first transceiver and controlling a direction of the transmitted identical data according to properties of a radio channel.

28. The computer program of claim 27, wherein the computer program medium is at least one of a computer readable medium, a program storage medium, a record medium, a computer readable memory, a random access memory, an erasable programmable read-only memory, a computer readable software distribution package, and a computer readable compressed software package.

* * * * *